(12) United States Patent
Diaz et al.

(10) Patent No.: US 8,394,180 B2
(45) Date of Patent: Mar. 12, 2013

(54) SYSTEMS AND METHODS FOR ABSORBING GASES INTO A LIQUID

(75) Inventors: Zaida Diaz, Katy, TX (US); Raymond Nicholas French, Sugar Land, TX (US); Dean Chien Wang, Missouri City, TX (US); Geoffrey Matthew Warren, CK Den Haag (NL)

(73) Assignee: Shell Oil Company, Houston, TX (US)

( * ) Notice: Subject to any disclaimer, the term of this patent is extended or adjusted under 35 U.S.C. 154(b) by 645 days.

(21) Appl. No.: 12/527,065

(22) PCT Filed: Feb. 14, 2008

(86) PCT No.: PCT/US2008/053902
§ 371 (c)(1),
(2), (4) Date: Feb. 22, 2010

(87) PCT Pub. No.: WO2008/101042
PCT Pub. Date: Aug. 21, 2008

(65) Prior Publication Data
US 2010/0140139 A1    Jun. 10, 2010

Related U.S. Application Data

(60) Provisional application No. 60/890,266, filed on Feb. 16, 2007.

(51) Int. Cl.
*C09K 8/60* (2006.01)
(52) U.S. Cl. .......... 95/236; 95/43; 95/44; 95/149; 95/210; 95/211; 95/226; 95/235; 95/237
(58) Field of Classification Search .......... 95/149, 95/210–211, 226, 235–237
See application file for complete search history.

(56) References Cited

U.S. PATENT DOCUMENTS

| | | | |
|---|---|---|---|
| 2,330,934 A | 10/1943 | Thacker | 23/206 |
| 2,492,719 A | 12/1949 | Thacker | 23/206 |
| 2,636,810 A | 4/1953 | Marisic | 23/206 |
| 2,670,801 A | 3/1954 | Sherborne | 166/21 |
| 3,087,788 A | 4/1963 | Porter | 23/181 |
| 3,345,135 A | 10/1967 | Kerr et al. | 23/206 |
| 3,366,452 A | 1/1968 | Lauer | 23/204 |
| 3,393,733 A | 7/1968 | Kuo et al. | 166/8 |
| 3,402,768 A | 9/1968 | Felsenthal et al. | 166/2 |
| 3,498,378 A | 3/1970 | Stone et al. | 166/263 |
| 3,581,821 A | 6/1971 | Ross | 166/245 |
| 3,647,906 A | 3/1972 | Farley | 260/683 D |
| 3,672,448 A | 6/1972 | Hoyt | 166/245 |
| 3,724,553 A | 4/1973 | Snavely, Jr. et al. | 166/304 |
| 3,729,053 A | 4/1973 | Froning | 166/304 |

(Continued)

FOREIGN PATENT DOCUMENTS

| | | |
|---|---|---|
| EP | 581026 | 2/1994 |
| GB | 1007674 | 10/1965 |

(Continued)

OTHER PUBLICATIONS

Dyrkacz, G. (2001). Energy & Fuels, 15,918-929.*

(Continued)

*Primary Examiner* — Brian McCaig

(57) ABSTRACT

A method of absorbing gases into a liquid comprising providing a stream of at least one desirable gas and at least one undesirable gas, exposing the gas stream to a liquid, so that the liquid absorbs more of the desirable gas than the undesirable gas, and releasing the liquid and gas mixture into an underground formation.

29 Claims, 6 Drawing Sheets

U.S. PATENT DOCUMENTS

| | | | |
|---|---|---|---|
| 3,754,598 A | 8/1973 | Holloway, Jr. | 166/249 |
| 3,794,114 A | 2/1974 | Brandon | 166/249 |
| 3,805,892 A | 4/1974 | Haynes, Jr. | 166/245 |
| 3,822,748 A | 7/1974 | Allen et al. | 166/269 |
| 3,823,777 A | 7/1974 | Allen et al. | 166/266 |
| 3,840,073 A | 10/1974 | Allen et al. | 166/274 |
| 3,847,221 A | 11/1974 | Allen et al. | 166/274 |
| 3,850,245 A | 11/1974 | Allen et al. | 166/274 |
| 3,878,892 A | 4/1975 | Allen et al. | 166/267 |
| 3,927,185 A | 12/1975 | Meadow et al. | 423/443 |
| 4,008,764 A | 2/1977 | Allen | 166/266 |
| 4,057,613 A | 11/1977 | Meadow et al. | 423/443 |
| 4,122,156 A | 10/1978 | Kittrell et al. | 423/443 |
| 4,182,416 A | 1/1980 | Trantham et al. | 166/245 |
| 4,305,463 A | 12/1981 | Zakiewicz | 106/245 |
| 4,330,038 A | 5/1982 | Soukup et al. | 166/267 |
| 4,393,937 A | 7/1983 | Dilgren et al. | 166/272 |
| 4,476,113 A | 10/1984 | Young et al. | 424/161 |
| 4,488,976 A | 12/1984 | Dilgren et al. | 252/8.55 D |
| 4,543,434 A | 9/1985 | Chang | 585/310 |
| 4,550,779 A | 11/1985 | Zakiewicz | 166/248 |
| 4,822,938 A | 4/1989 | Audeh et al. | 585/324 |
| 4,963,340 A | 10/1990 | Audeh et al. | 423/444 |
| 5,065,821 A | 11/1991 | Huang et al. | 166/245 |
| 5,076,358 A | 12/1991 | Kissel | 166/275 |
| 5,120,935 A | 6/1992 | Nenniger | 392/305 |
| 5,167,280 A | 12/1992 | Sanchez et al. | 166/267 |
| 5,607,016 A | 3/1997 | Butler | 166/263 |
| 5,609,845 A | 3/1997 | Cimini et al. | 423/648.1 |
| 5,803,171 A | 9/1998 | McCaffery et al. | 166/245 |
| 5,826,656 A | 10/1998 | McGuire et al. | 166/305.1 |
| 6,136,282 A | 10/2000 | Fisher | 423/220 |
| 6,149,344 A | 11/2000 | Eaton | 405/128 |
| 6,241,019 B1 | 6/2001 | Davidson et al. | 166/249 |
| 6,405,797 B2 | 6/2002 | Davidson et al. | 166/249 |
| 6,497,855 B1 | 12/2002 | Wachs | 423/648.1 |
| 6,506,349 B1 | 1/2003 | Khanmamedov | 423/210 |
| 6,666,908 B2 * | 12/2003 | Cadours et al. | 95/166 |
| 6,706,108 B2 | 3/2004 | Polston | 106/285 |
| 6,851,473 B2 | 2/2005 | Davidson | 166/263 |
| 6,893,620 B2 | 5/2005 | Watson et al. | 423/224 |
| 6,919,059 B2 | 7/2005 | Watson et al. | 423/224 |
| 6,919,296 B2 | 7/2005 | Geus et al. | 502/325 |
| 6,946,111 B2 | 9/2005 | Keller et al. | 423/576.2 |
| 7,025,134 B2 | 4/2006 | Byrd et al. | 166/105 |
| 7,090,818 B2 | 8/2006 | Stauffer | 423/443 |
| 7,128,150 B2 | 10/2006 | Thomas et al. | 166/266 |
| 7,426,959 B2 | 9/2008 | Wang et al. | 166/52 |
| 2003/0194366 A1 | 10/2003 | Srinivas et al. | 423/230 |
| 2004/0159583 A1 | 8/2004 | Mesters et al. | 208/208 |
| 2005/0189108 A1 | 9/2005 | Davidson | 166/249 |
| 2006/0213657 A1 * | 9/2006 | Berchenko et al. | 166/245 |
| 2006/0254769 A1 * | 11/2006 | Wang et al. | 166/266 |
| 2007/0251686 A1 | 11/2007 | Sivrikoz et al. | 166/249 |
| 2008/0023198 A1 | 1/2008 | Hsu | 166/268 |
| 2008/0087425 A1 | 4/2008 | Hsu et al. | 166/266 |

FOREIGN PATENT DOCUMENTS

| | | |
|---|---|---|
| GB | 2379685 | 3/2003 |
| WO | WO9850679 | 11/1998 |
| WO | WO2007131976 | 11/2007 |
| WO | WO2007131977 | 11/2007 |
| WO | WO2008003732 | 1/2008 |
| WO | WO2008034777 | 3/2008 |

OTHER PUBLICATIONS

Carvalho, P.J. et al. (2011). Journal of Chemical & Engineering Data, 56, 2786-2792.*

Murrieta-Guevara, F. et al. (1988). Fluid Phase Equilibria, 44, 105-115.*

* cited by examiner

Figure 4

| Gas Solubility in Carbon Disulfide at 25 Degrees Celsius and Gas Partial Pressure of 1 Atmosphere | |
|---|---|
| Gas | $X_{gas}$ |
| H2S | 3.1E-02 |
| CO2 | 3.3E-03 |
| CH4 | 1.3E-03 |
| Argon | 4.9E-04 |
| Oxygen | 4.4E-04 |
| CO | 3.6E-04 |
| Nitrogen | 2.2E-04 |

Figure 6

Data compiled in Solubility of Nonelectroytes, Hildebrand & Scott, 3rd ed. (1950)

| Solvent | $CO_2$ Mole fraction $\times 10^{-4}$<br>T = 0C, P($CO_2$) = 1 atm. |
|---|---|
| Amyl acetate | 270 |
| Acetone | 209 |
| Pyridine | 129 |
| Benzaldehyde | 128 |
| Ethylene dichloride | 125 |
| Chloroform | 123 |
| Acetic acid | 121 |
| Nitrobenzene | 113 |
| Toluene | 107 |
| m-Xylene | 102 |
| Carbon tetrachloride | 100 |
| Benzene | 91 |
| i-Amyl alcohol | 87 |
| Ethylene bromide | 82 |
| Propyl alcohol | 77 |
| Methyl alcohol | 71 |
| o-Toluidine | 66 |
| Aniline | 55 |
| Carbon Disulfide | 22 |
| Water | 7 |

SYSTEMS AND METHODS FOR ABSORBING GASES INTO A LIQUID

The present application claims priority of U.S. Provisional Patent Application No. 60/890,266 filed 16 Feb. 2007.

FIELD OF THE INVENTION

The present disclosure relates to systems and methods for selectively absorbing one or more gases into a liquid.

BACKGROUND OF THE INVENTION

Enhanced Oil Recovery (EOR) may be used to increase oil recovery in fields worldwide. There are three main types of EOR, thermal, chemical/polymer and gas injection, which may be used to increase oil recovery from a reservoir, beyond what can be achieved by conventional means—possibly extending the life of a field and boosting the oil recovery factor.

Thermal enhanced recovery works by adding heat to the reservoir. The most widely practiced form is a steam-drive, which reduces oil viscosity so that it can flow to the producing wells. Chemical flooding increases recovery by reducing the capillary forces that trap residual oil. Polymer flooding improves the sweep efficiency of injected water. Miscible gas injection works in a similar way to chemical flooding. By injecting a fluid that is miscible with the oil, trapped residual oil can be recovered.

Oil is often withdrawn from a reservoir in a non-uniform manner. That is, most of the oil is produced from the more easily drainable sections of the formation, and relatively little oil comes from the less easily drainable sections. This is especially true in highly fractured reservoirs or those having sections of widely varying permeability wherein oil is left in the less accessible portions of the reservoir. In such reservoirs an ordinary secondary recovery flooding treatment is often of limited value, as the injected fluid tends to sweep or pass through the same sections of the formation which are susceptible to good drainage, thus either bypassing or entering to only a limited extent those sections of the formation which cannot be readily drained.

Certain liquids and gases are desirable for secondary recovery flooding treatments as they have the ability to mix with the oil in place and be produced from the formation as a mixture. Other liquids and gases are undesirable for secondary recovery flooding treatments as they do not mix with the oil in place and often finger through the formation leaving most of the oil in the formation. In certain situations, there is a gas stream containing both desirable and undesirable gases. There is a need in the art for systems and methods to separate the desirable from the undesirable gases.

Referring to FIG. 1, there is illustrated prior art system 100. System 100 includes underground formation 102, underground formation 104, underground formation 106, and underground formation 108. Production facility 110 is provided at the surface. Well 112 traverses formations 102 and 104, and terminates in formation 106. The portion of formation 106 is shown at 114. Oil and/or gas are produced from formation 106 through well 112, to production facility 110. Gas and liquid may be separated from each other, gas stored in gas storage 116 and liquid stored in liquid storage 118.

U.S. Pat. No. 5,167,280 discloses a solvent stimulation process whereby a viscosity reducing agent is circulated through a horizontal well via a production string. Said agent exits the production string and enters an annulus formed by said string and a liner. Said agent diffuses into the reservoir at a pressure below the reservoir pressure. As said agent diffuses through the reservoir under the influence of a concentration gradient, it reduces the oil's viscosity and makes it mobile. Simultaneously, oil of reduced viscosity migrates into the well under a pressure drawdown influence. A pseudo steady state production rate is achieved when convective movement of the oil of reduced viscosity is exactly counterbalanced by the diffusional rate of the viscosity reducing agent in a stimulated radial zone along said well. This stimulates a large volume of oil through the extensive surface area of the wellbore thus producing increased volumes of hydrocarbonaceous fluids from the reservoir. The viscosity reducing agent may be selected from a member of the group consisting of carbon dioxide, flu gas, carbon monoxide, helium, hydrogen, C1-C10 hydrocarbons, methanol, ethanol, toluene, carbon disulfide, and mixtures thereof. U.S. Pat. No. 5,167,280 is herein incorporated by reference in its entirety.

There are available streams of gas mixtures, for example waste streams from a chemical process or a heater, which can be used for EOR. However, these streams of gas mixtures may contain one or more gases that are desirable for EOR and one or more gases that are undesirable for EOR. There is a need in the art to separate the desirable from the undesirable gases.

There is a further need in the art for improved systems and methods for enhanced oil recovery. There is a need in the art for improved systems and methods for enhanced oil recovery with injectant mixtures. There is a need in the art for improved systems and methods for enhanced oil recovery with improved injectant mixing apparatus and methods.

SUMMARY OF THE INVENTION

In one aspect, the invention provides a method of absorbing gases into a liquid comprising providing a stream of at least one desirable gas and at least one undesirable gas, exposing the gas stream to a liquid, so that the liquid absorbs more of the desirable gas than the undesirable gas, and releasing the liquid and gas mixture into an underground formation.

In another aspect, the invention provides a system for producing oil and/or gas comprising a first formulation comprising a liquid, a second formulation comprising at least one desirable gas and at least one undesirable gas, a mechanism for absorbing at least a portion of the second formulation into the first formulation, to create a third formulation comprising the liquid, a larger portion of the desirable gas, and a smaller portion of the undesirable gas, and a mechanism for releasing at least a portion of the third formulation into an underground formation.

In another aspect, the invention provides a method for producing oil and/or gas comprising contacting a first formulation comprising carbon disulfide with a second formulation comprising at least one of hydrogen sulfide and carbon dioxide to create a third formulation comprising carbon disulfide and at least one of hydrogen sulfide and carbon dioxide, and releasing the third formulation into a formation.

In another aspect, the invention provides.

Advantages of the invention include one or more of the following:

Improved systems and methods for enhanced recovery of hydrocarbons from a formation with a carbon disulfide and a gas containing formulation.

Improved systems and methods for enhanced recovery of hydrocarbons from a formation with a fluid containing carbon disulfide and a gas containing formulation.

Improved systems and methods for enhanced oil recovery.

Improved systems and methods for producing a carbon disulfide and a gas containing formulation.

Improved systems and methods for enhanced oil recovery using a compound which is miscible with oil in place.

Improved systems and methods for making and/or using sulfur containing enhanced oil recovery agents.

BRIEF DESCRIPTION OF THE DRAWINGS

FIG. 4 illustrates a table of gas solubilities.
FIG. 6 illustrates a table of gas solubilities.

DETAILED DESCRIPTION OF THE INVENTION

Figure 1:
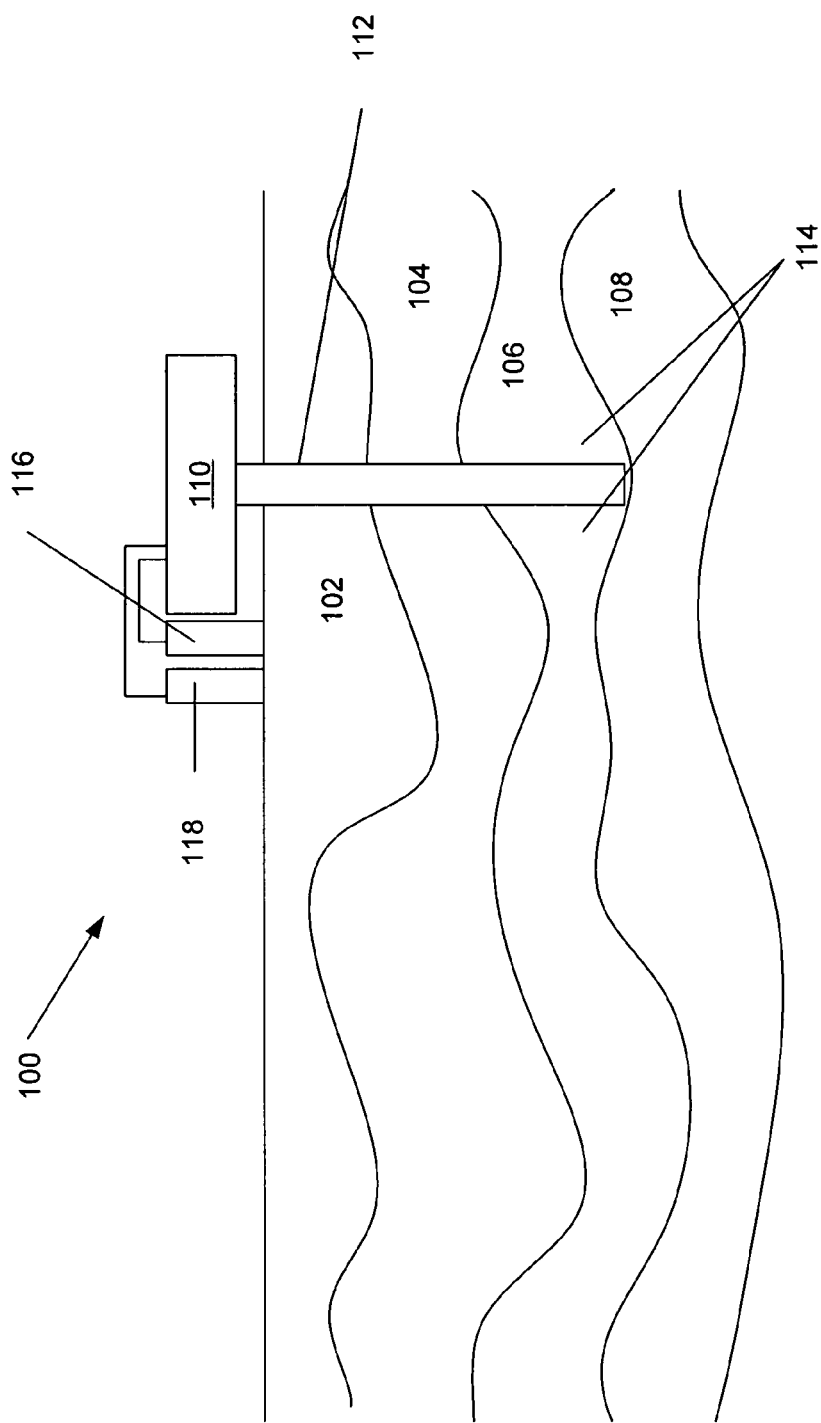
FIG. 1 illustrates an oil and/or gas production system.
Figure 2:
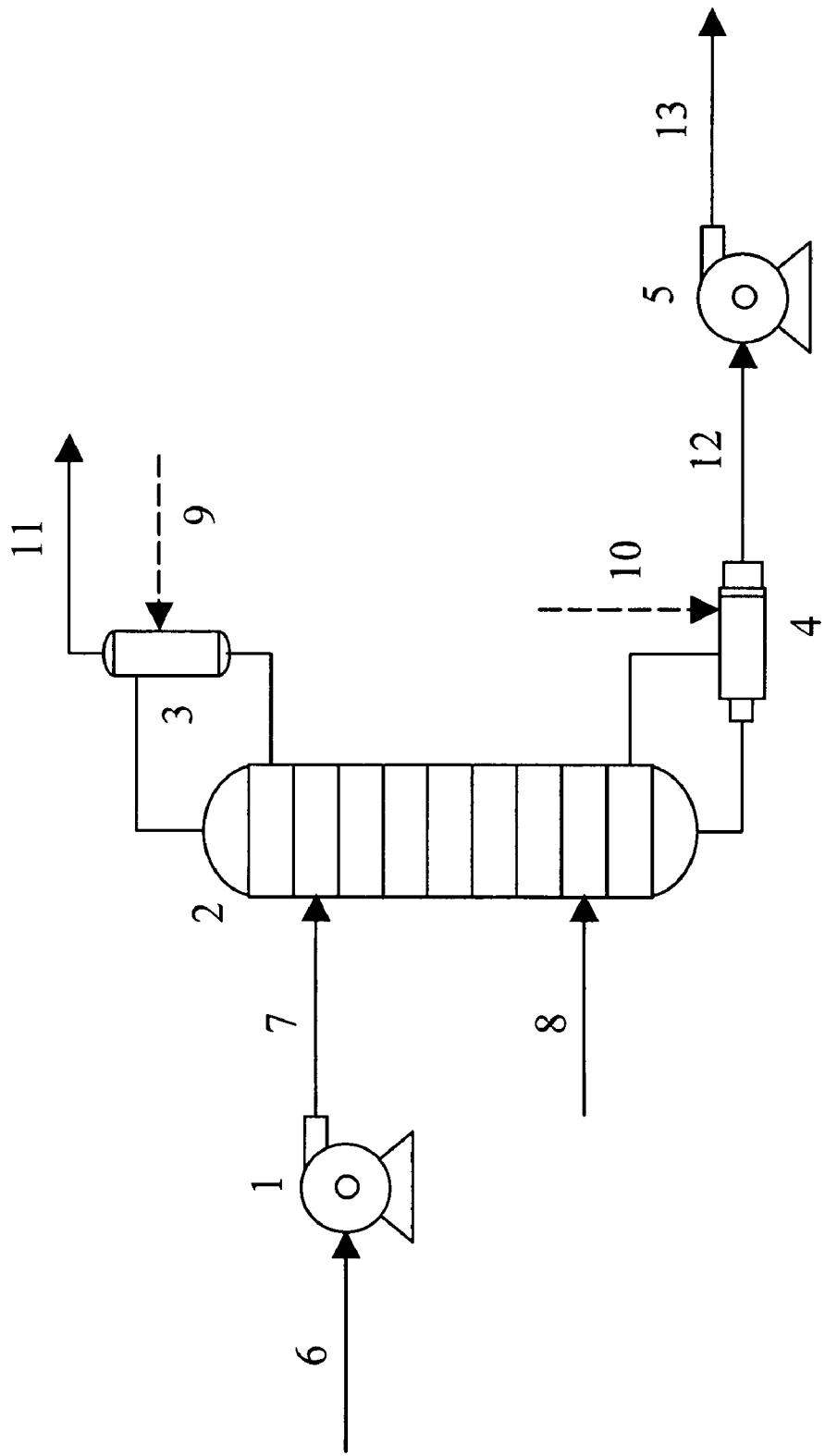
FIG. 2 illustrates a liquid and gas absorbing system.

Referring now to FIG. 2, in one embodiment of the invention, a liquid solvent stream 6, for example carbon disulfide is introduced to pump, 1, such that the resulting liquid solvent stream 7 possesses a pressure of 35 bar and temperature of 27° C. The liquid solvent stream 7 and a mixed gas stream 8, for example carbon dioxide and nitrogen, are introduced into absorber column 2. The mixed gas stream 8 contains 50% carbon dioxide and 50% nitrogen by volume at a pressure of 35 bar and a temperature of 40° C. The ratio of the flow rates of the gas stream 8 to the liquid stream 7 is 22 in molar terms. Absorber column 2 has ten trays or stages, an overhead condenser 3, and a bottom reboiler 4. The absorber column 2, operates with a reflux ratio of 0.35. The condenser 3, which operates at a pressure of 32 bar and a temperature of −37° C., is cooled by cooling stream 9. One possible source for cooling stream 9 is a propane loop. Other methods of providing cooling are also available and known to those skilled in the art. The reboiler 4, is heated by heating stream 10 and operates at conditions of 34 bar and −8° C. The overheads product stream 11 contains 57% nitrogen and 43% carbon dioxide by volume with virtually no carbon disulfide. The bottoms product stream 12 contains 73% carbon dioxide, 26% carbon disulfide, and 1% nitrogen by volume. The ratio of the flow rates of the overheads product stream 11 to the bottoms product stream 12 is five in molar terms. The pressure of the bottoms stream 12 is increased in a pump 5, for injection into a subsurface formation. For reservoir conditions of 60 bar and 20° C., the injectant mixture has a single-phase density of 1.015 g/cm$^3$, while for reservoir conditions of 90 bar and 50° C., the injectant mixture has a single-phase density of 0.86 g/cm$^3$. It will be apparent to those skilled in the art that the ratio of gas to liquid in the mixture can be tailored according to reservoir conditions.

Carbon disulfide is from about 50 to about 100 times more effective at absorbing carbon dioxide than nitrogen in the absorber, for example about 75 times more effective.

Absorber 2 feeds and process conditions may be adjusted so that stream 12 contains from about 10% to about 50% carbon disulfide, from about 30% to about 90% carbon dioxide, and less than about 10% nitrogen by volume, for example less than about 5%, or less than about 1%.

Stream 12 may be mixed with from about 20% to about 80% hydrogen sulfide, for example from about 40% to about 60% by volume.

Carbon disulfide containing stream 6 may be carbon disulfide in an impure form produced with the systems and/or methods disclosed in U.S. Pat. No. 7,426,959 is herein incorporated by reference in its entirety.

Absorber 2 may operate at a pressure from about 5 to about 50 bars, for example from about 10 to about 40 bars.

Absorber 2 operates at a temperature from about −50 to about 100 degrees celsius, for example from about from about −20 to about 50 degrees celsius.

Stream 8, containing carbon dioxide and nitrogen may be a waste stream from a flue gas process.

Figure 3:
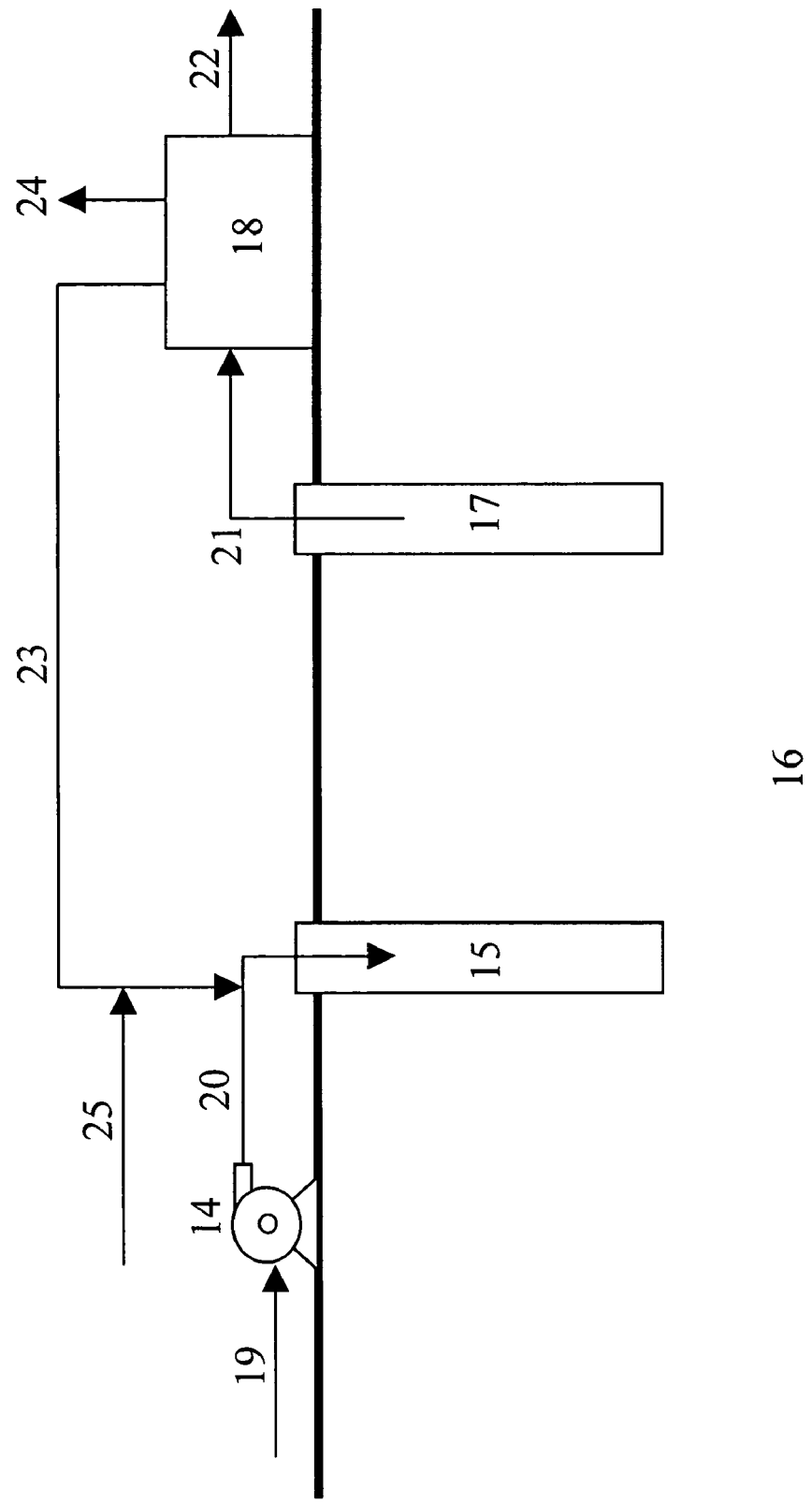
FIG. 3 illustrates an oil and/or gas production system.

Referring now to FIG. 3, in some embodiments, a gas stream 19 containing carbon disulfide and one or more of carbon dioxide, hydrogen sulfide, methane, ethane, propane, butane, and/or pentane is introduced to a pump 14, to achieve pressures needed for injection into the subsurface. The higher-pressure injectant stream 20 is then injected in a well 15, into reservoir formation 16. The produced fluid stream 21, from production well 17, may contain components of the injectant mixture, oil and other hydrocarbons, gases, water, dissolved and undissolved components such as minerals and salts, and other substances. In some embodiments, injection well 15, and the production well 17, are the same well, as in a "Huff 'n Puff" process. The produced stream 21 may be processed in surface facility processing unit 18, to yield hydrocarbon containing product stream 22, stream 23 containing components of the injectant mixture, and one or more streams, represented by stream 24 in the figure, containing one or more other produced substances. It is possible that the streams exiting the surface facility processing unit will not be pure in the desired component(s), for example some hydrocarbons may be found in stream 23 or stream 24. The stream 23 including one or more components of the injectant mixture may then be recycled by mixing with stream 20 for subsurface injection. If necessary, additional component(s) of the injectant mixture through stream 25 may be made to achieve the desired composition introduced into the subsurface.

Suitable systems and methods for injecting a carbon disulfide formulation, and producing hydrocarbons are disclosed in U.S. Pat. No. 7,426,959 is herein incorporated by reference in its entirety.

Carbon disulfide formulation may include carbon disulfide and/or carbon disulfide derivatives for example, thiocarbonates, xanthates and mixtures thereof; and optionally one or more of the following: hydrogen sulfide, sulfur, carbon dioxide, hydrocarbons, and mixtures thereof.

Carbon disulfide formulation or carbon disulfide formulation mixed with other components may be miscible in oil and/or gas in the formation 16. In some embodiments, carbon disulfide formulation or carbon disulfide formulation mixed with other components may be mixed in with oil and/or gas in formation 16 to form a miscible mixture which is produced to well 17.

Carbon disulfide formulation or carbon disulfide formulation mixed with other components may be immiscible in oil and/or gas in formation 16. In some embodiments, carbon disulfide formulation or carbon disulfide formulation mixed with other components may not mix in with oil and/or gas in formation 16, so that carbon disulfide formulation or carbon disulfide formulation mixed with other components travels as a plug across formation 16 to force oil and/or gas to well 17.

A quantity of carbon disulfide formulation or carbon disulfide formulation mixed with other components may be injected into well 15, followed by another component to force carbon disulfide formulation or carbon disulfide formulation mixed with other components across formation 16, for example air; water in gas or liquid form; water mixed with one or more salts, polymers, and/or surfactants; carbon dioxide; other gases; other liquids; and/or mixtures thereof.

Referring now to FIG. 4, the gas solubility of various gases in carbon disulfide is illustrated in tabular form. As can be seen from the table, hydrogen sulfide, carbon dioxide, and methane are dissolved into carbon disulfide more easily and/or in greater quantities than oxygen, carbon monoxide, and nitrogen.

Figure 5:
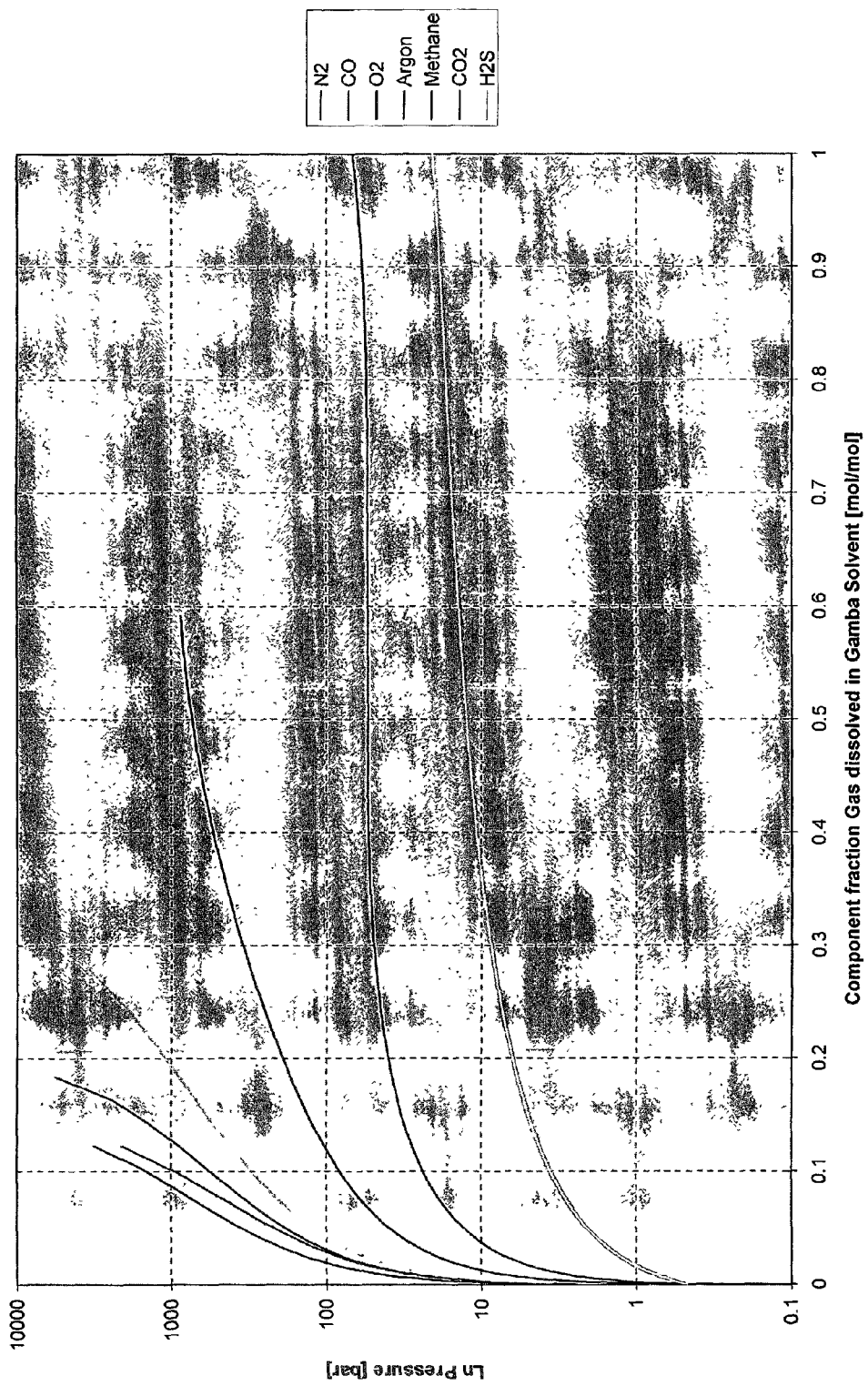
FIG. 5 illustrates a graph of gas solubilities.

Referring now to FIG. 5, the bubble point of various gases in a mixture with carbon disulfide is illustrated in tabular form. As can be seen from the figure, for a given gas-carbon disulfide mixture, increasing quantities of the gas can be held in solution with increasing pressures. Conversely, lowering the pressure will cause a portion of the gas to bubble out of solution. Also, for a given pressure, a much larger quantity of hydrogen sulfide, carbon dioxide, and/or methane can be dissolved into carbon disulfide, as compared to a much smaller quantity of oxygen, carbon monoxide, and/or nitrogen.

A solvent may be mixed with a desirable gas and an undesirable gas to form a solvent-gas mixture. The solvent-gas mixture contains a higher proportion of the desirable gas as compared to the undesirable gas, based on the higher solubility of the desirable gas into the solvent as compared with the undesirable gas. The higher proportion of desirable gas may be at least about two times as much, at least about five times as much, at least about ten times as much, or at least about twenty times as much.

Referring now to FIG. 6, the gas solubility of carbon dioxide in various solvents is illustrated in tabular form. As can be seen from the table, numerous solvents can be used to dissolve carbon dioxide.

The solvent to dissolve one or more desirable gases may be chosen from those listed in FIG. 6. Alternatively, the solvent may be chosen from carbon disulfide, benzene, toluene, xylene chlorinated hydrocarbons, for example, carbon tetrachloride or methylene chloride, $C_6$-$C_{15}$ hydrocarbons, such as gasoline or diesel, mineral oils, other naphthenic or paraffinic hydrocarbons, and/or mixtures thereof.

The desirable gas may include one or more of hydrogen sulfide, carbon dioxide, methane, ethane, propane, butane, pentane, and/or mixtures thereof.

The undesirable gas may include one or more of oxygen, carbon monoxide, nitrogen, and/or mixtures thereof.

The mixture of the solvent, a large portion of one or more desirable gases, and a smaller portion of one or more undesirable gases may be injected into a subsurface formation.

The mixture of the solvent, a large portion of one or more desirable gases, and a smaller portion of one or more undesirable gases may be injected into a subsurface formation to be used for enhanced oil recovery of hydrocarbons from the subsurface formation.

In one example, the solvent carbon disulfide is mixed with at least one of hydrogen sulfide, carbon dioxide, methane, ethane, propane, butane, pentane, and at least one of oxygen, carbon monoxide, and nitrogen, to form a mixture. The mixture may then be injected into a subsurface formation. The mixture may be about 20-50% carbon disulfide, about 20-50% hydrogen sulfide, and less than about 10% each of oxygen and nitrogen. The mixture may be about 20-50% carbon disulfide, about 20-50% carbon dioxide, and less than about 10% each of oxygen and nitrogen. The mixture may be about 20-50% carbon disulfide, about 15-40% carbon dioxide, about 15-40% hydrogen sulfide, and less than about 10% each of oxygen and nitrogen.

In one embodiment of the invention, there is disclosed a method of absorbing gases into a liquid comprising providing a stream of at least one desirable gas and at least one undesirable gas, exposing the gas stream to a liquid, so that the liquid absorbs more of the desirable gas than the undesirable gas, and releasing the liquid and gas mixture into an underground formation. In some embodiments, the method also includes producing hydrocarbons from the underground formation, after releasing the liquid and gas mixture. In some embodiments, the at least one desirable gas comprises hydrogen sulfide and/or carbon dioxide. In some embodiments, the at least one desirable gas comprises carbon dioxide. In some embodiments, the at least one undesirable gas comprises nitrogen and/or oxygen. In some embodiments, the at least one undesirable gas comprises nitrogen. In some embodiments, the liquid comprises at least one of carbon disulfide, benzene, toluene, xylene, chlorinated hydrocarbons, for example carbon tetrachloride or methylene chloride, C6-C15 hydrocarbons, such as gasoline or diesel, mineral oils, other naphthenic or paraffinic hydrocarbons, and/or mixtures thereof. In some embodiments, the liquid comprises carbon disulfide. In some embodiments, the liquid absorbs at least two times more of the desirable gas than the undesirable gas, for example on a molar basis. In some embodiments, the liquid absorbs at least five times more of the desirable gas than the undesirable gas, for example on a molar basis. In some embodiments, the liquid absorbs at least ten times more of the desirable gas than the undesirable gas, for example on a molar basis.

In one embodiment of the invention, there is disclosed a system for producing oil and/or gas comprising a first formulation comprising a liquid, a second formulation comprising at least one desirable gas and at least one undesirable gas, a mechanism for absorbing at least a portion of the second formulation into the first formulation, to create a third formulation comprising the liquid, a larger portion of the desirable gas, and a smaller portion of the undesirable gas, and a mechanism for releasing at least a portion of the third formulation into an underground formation. In some embodiments, the system also includes a mechanism for recovering at least one of a liquid and gas from the formation, the mechanism for recovering comprising a well in the underground formation and a recovery facility at a topside of the well. In some embodiments, the mechanism for releasing the third formulation comprises a well in the underground formation for releasing the third formulation into the formation. In some embodiments, the underground formation is beneath a body of water. In some embodiments, the system also includes a mechanism for injecting water, the mechanism adapted to inject water into the formation after the third formulation has been released into the formation. In some embodiments, the mechanism for absorbing comprises an absorber column. In some embodiments, the first formulation comprises at least 50% carbon disulfide by volume. In some embodiments, the second formulation comprises at least 40% carbon dioxide by molar fraction. In some embodiments, the second formulation comprises at least 20% carbon dioxide by molar fraction, and at least 20% hydrogen sulfide by molar fraction. In some embodiments, the third formulation comprises at least 40% carbon dioxide and at least 10% carbon disulfide by molar fraction. In some embodiments, the third formulation comprises at least 60% carbon dioxide and at least 20% carbon disulfide. In some embodiments, the third formulation comprises at least 20% carbon dioxide, at least 20% hydrogen sulfide, and at least 20% carbon disulfide by molar fraction. In some embodiments, the mechanism for releasing comprises an injection well, and wherein the mechanism for recovering comprises a plurality of production wells about the injection well. In some embodiments, at least one of the plurality of the production wells is adapted to be shut off when the third formulation from the injection well reaches that production well.

In one embodiment of the invention, there is disclosed a method for producing oil and/or gas comprising contacting a first formulation comprising carbon disulfide with a second formulation comprising at least one of hydrogen sulfide and carbon dioxide to create a third formulation comprising carbon disulfide and at least one of hydrogen sulfide and carbon dioxide, and releasing the third formulation into a formation. In some embodiments, the method also includes recovering at least one of a liquid and a gas from the formation. In some embodiments, the method also includes recovering at least a portion of the third formulation from the formation, and then releasing at least a portion of the recovered third formulation into the formation. In some embodiments, releasing comprises injecting at least a portion of the third formulation into the formation in a mixture with one or more of hydrocarbons; water in the form of liquid and/or vapor; sulfur compounds other than carbon disulfide; carbon monoxide; or mixtures thereof. In some embodiments, the method also includes heating the third formulation prior to releasing the third formulation into the formation, or while within the formation. In some embodiments, another material is released into the formation after the third formulation is released, for example the another material selected from the group consisting of air, water in the form of liquid and/or vapor, carbon dioxide, and/or mixtures thereof. In some embodiments, the third formulation is released at a pressure from 0 to 37,000 kilopascals above the initial reservoir pressure, measured prior to when injection begins. In some embodiments, the method also includes converting at least a portion of the recovered liquid and/or gas into a material selected from the group consisting of transportation fuels such as gasoline and diesel, heating fuel, lubricants, chemicals, and/or polymers.

Those of skill in the art will appreciate that many modifications and variations are possible in terms of the disclosed embodiments of the invention, configurations, materials and methods without departing from their spirit and scope. Accordingly, the scope of the claims appended hereafter and their functional equivalents should not be limited by particular embodiments described and illustrated herein, as these are merely exemplary in nature.

That which is claimed is:

1. A method of absorbing gases into a liquid comprising:
   providing a stream of at least one desirable gas comprising hydrogen sulfide and/or carbon dioxide and at least one undesirable gas;
   exposing the gas stream to a liquid comprising at least 50 vol. % carbon disulfide, so that the liquid absorbs more of the desirable gas than the undesirable gas; and
   releasing the liquid and gas mixture into an underground formation.

2. The method of claim 1, further comprising producing hydrocarbons from the underground formation after releasing the liquid and gas mixture into the underground formation.

3. The method of claim 1 wherein the at least one undesirable gas comprises nitrogen and/or oxygen.

4. The method of claim 1 wherein the at least one undesirable gas comprises nitrogen.

5. The method of claim 1 wherein the liquid further comprises at least one of benzene, toluene, xylene, a chlorinated hydrocarbon, a C6-C15 hydrocarbon, or a mixture thereof.

6. The method of claim 1 wherein the liquid absorbs at least two times more of the desirable gas than the undesirable gas on a molar basis.

7. The method of claim 1 wherein the liquid absorbs at least five times more of the desirable gas than the undesirable gas on a molar basis.

8. The method of claim 1 wherein the liquid absorbs at least ten times more of the desirable gas than the undesirable gas on a molar basis.

9. A system for producing oil and/or gas comprising:
   a first formulation comprising a liquid comprising at least 50 vol. % carbon disulfide;
   a second formulation comprising at least one desirable gas comprised of carbon dioxide and/or hydrogen sulfide and at least one undesirable gas;
   a mechanism for absorbing at least a portion of the second formulation into the first formulation, to create a third formulation comprising the liquid, a larger portion of the desirable gas, and a smaller portion of the undesirable gas; and
   a mechanism for releasing at least a portion of the third formulation into an underground formation.

10. The system of claim 9, further comprising a mechanism for recovering at least one of a liquid and gas from the formation, the mechanism for recovering comprising a well in the underground formation and a recovery facility at a topside of the well.

11. The system of claim 10, wherein the mechanism for releasing comprises an injection well, and wherein the mechanism for recovering comprises a plurality of production wells about the injection well.

12. The system of claim 11, wherein at least one of the plurality of the production wells is adapted to be shut off when the third formulation from the injection well reaches that production well.

13. The system of claim 9 wherein the mechanism for releasing the third formulation comprises a well in the underground formation for releasing the third formulation into the formation.

14. The system of claim 9 wherein the underground formation is beneath a body of water.

15. The system of claim 9 further comprising a mechanism for injecting water, the mechanism adapted to inject water into the formation after the third formulation has been released into the formation.

16. The system of claim 9 wherein the mechanism for absorbing comprises an absorber column.

17. The system of claim 9 wherein the second formulation comprises at least 40% carbon dioxide by molar fraction.

18. The system of claim 9 wherein the second formulation comprises at least 20% carbon dioxide by molar fraction and at least 20% hydrogen sulfide by molar fraction.

19. The system of claim 9 wherein the third formulation comprises at least 40% carbon dioxide and at least 10% carbon disulfide by molar fraction.

20. The system of claim 9 wherein the third formulation comprises at least 60% carbon dioxide and at least 20% carbon disulfide.

21. The system of claim 9 wherein the third formulation comprises at least 20% carbon dioxide, at least 20% hydrogen sulfide, and at least 20% carbon disulfide by molar fraction.

22. A method for producing oil and/or gas comprising:
   contacting a first formulation comprising at least 50 vol. % carbon disulfide with a second formulation comprising at least one of hydrogen sulfide and carbon dioxide to create a third formulation comprising carbon disulfide and at least one of hydrogen sulfide and carbon dioxide; and
   releasing the third formulation into a formation.

23. The method of claim 22, further comprising recovering at least one of a liquid and a gas from the formation.

24. The method of claim 23, further comprising converting at least a portion of the recovered liquid and/or gas into a material selected from the group consisting of a transportation fuel, a heating fuel, a lubricant, a chemical, and a polymer.

25. The method of claim 22, further comprising recovering at least a portion of the third formulation from the formation, and then releasing at least a portion of the recovered third formulation into the formation.

26. The method of claim 22 wherein releasing comprises injecting at least a portion of the third formulation into the formation in a mixture with one or more of hydrocarbons; water in the form of liquid and/or vapor; sulfur compounds other than carbon disulfide; carbon monoxide; or mixtures thereof.

27. The methods of claim 22, further comprising heating the third formulation prior to releasing the third formulation into the formation, or while within the formation.

28. The method of claim 22 wherein another material is released into the formation after the third formulation is released, wherein the another material is selected from the group consisting of air, water in the form of liquid and/or vapor, carbon dioxide, and mixtures thereof.

29. The method of claim 22 wherein the third formulation is released at a pressure from 0 to 37,000 kilopascals above the initial reservoir pressure, measured prior to when injection begins.

* * * * *